United States Patent
Hillis et al.

(10) Patent No.: US 9,624,904 B2
(45) Date of Patent: Apr. 18, 2017

(54) WIND TURBINE DEFENSE TO ESCAPE HIGH WIND EVENTS

(71) Applicant: Applied Minds, LLC, Glendale, CA (US)

(72) Inventors: W. Daniel Hillis, Toluca Lake, CA (US); Luke Walter Khanlian, Granada Hills, CA (US); Dev Kumar, Burbank, CA (US); Jascha Tucker Little, Austin, TX (US)

(73) Assignee: APPLIED INVENTION, LLC, Burbank, CA (US)

( * ) Notice: Subject to any disclaimer, the term of this patent is extended or adjusted under 35 U.S.C. 154(b) by 346 days.

(21) Appl. No.: 14/231,542

(22) Filed: Mar. 31, 2014

(65) Prior Publication Data

US 2014/0294596 A1    Oct. 2, 2014

Related U.S. Application Data (60) Provisional application No. 61/807,227, filed on Apr. 1, 2013.

(51) Int. Cl.
*F03D 7/02* (2006.01)
*F03D 13/20* (2016.01)

(52) U.S. Cl.
CPC ......... *F03D 7/0268* (2013.01); *F03D 7/0212* (2013.01); *F03D 13/20* (2016.05); *F05B 2240/915* (2013.01); *F05B 2240/9121* (2013.01); *Y02E 10/723* (2013.01); *Y02E 10/728* (2013.01); *Y10T 29/49117* (2015.01); *Y10T 29/49625* (2015.01)

(58) Field of Classification Search
CPC ....... F03D 7/0268; F03D 7/0212; F03D 13/20
USPC ......................................................... 416/246
See application file for complete search history.

(56) References Cited

U.S. PATENT DOCUMENTS

| | | | | |
|---|---|---|---|---|
| 4,311,434 A | * | 1/1982 | Abe | ...................... B66C 23/207 416/142 |
| 8,545,187 B2 | | 10/2013 | Presz, Jr. et al. | |
| 8,602,736 B2 | * | 12/2013 | Russ | .................... B64D 41/007 416/143 |

* cited by examiner

*Primary Examiner* — Kevin Lee
(74) *Attorney, Agent, or Firm* — Michael A. Glenn; Perkins Coie LLP (57) ABSTRACT

Embodiments of the invention provide a number of passive and active defense designs and methods that enable a wind turbine to escape high wind events. The disclosure includes descriptions of multiple designs and methods for lowering the elevated portion of a wind turbine. Other embodiments of the invention concern ways to connect the elevated portion of a wind turbine to the tower. Numerous counterweight systems are also disclosed which enable the lowering of the elevated portion of the wind turbine.

23 Claims, 6 Drawing Sheets

WIND TURBINE DEFENSE TO ESCAPE HIGH WIND EVENTS

CROSS REFERENCE TO RELATED APPLICATIONS

This application claims priority to U.S. provisional patent application Ser. No. 61/807,227, filed Apr. 1, 2013, which application is incorporated herein in its entirety by this reference thereto.

FIELD

The invention relates to wind turbines. More particularly, the invention relates to protecting wind turbines in high wind conditions.

BACKGROUND

Conventional wind turbines ("turbines") used for power generation generally have two to five open blades arranged like a propeller, commonly called a rotor, that are mounted perpendicular to the ground. The rotor is mounted to a horizontal shaft attached to a gear box which drives a power generator. The gear box, generator, and other components are contained within a shell typically called a nacelle.

In the most general sense, turbines contain three main components: (1) the base or foundation which anchors the wind turbine in place, (2) the tower which provides the necessary height, and (3) the elevated portion of the wind turbine which includes the rotor, nacelle, and power generating components.

Conventional wind turbines typically require a supporting tower ranging from 60 to 90 meters in height. Taller towers enable larger blades, but also lift the blades into winds that are stronger and more consistent at higher elevations. As a result, the rotor, nacelle, and other components are typically mounted to the top of the tower.

A shrouded wind turbine has a fixed aerodynamic shroud that surrounds the rotor and accelerates air flow through the turbine. This arrangement improves the power delivered from the turbine and its efficiency.

When wind turbines are exposed to excessively high speed winds, the additional wind energy can damage the elevated portion of the wind turbine or support structures. It is not uncommon for wind speeds to become violent enough to damage turbine support structures or even destroy turbines entirely. Even though these events are not frequent, it is an economic and safety imperative for a turbine operator that the wind turbines be constructed to withstand the power of these winds. This results in a turbine that is built with a lot of reinforcing material that is not needed under most operating conditions.

There are a number of prior art attempts to protect wind turbines from high wind damage. For example, in strong wind conditions, the blades of a wind turbine can be furled or the entire turbine can be yawed away from the direction of the wind. These methods work well for protecting the turbine at wind speeds of 45-50 miles per hour. However, in higher wind situations, such as hurricane force winds of 74 mph or higher, damage to the turbine or its structures may still occur. In addition, because the blades of a turbine are located so close to the tower, strong winds are known to bend the blades back so that the blades hit the tower. This phenomenon is known as a tower strike.

The problems of high wind speeds are particularly compounded with certain wind turbine designs. For example, in the case of a shrouded wind turbine, the shroud is a large fixed structure at the top of the turbine tower and thus represents a major source of wind loading, both in total wind force as well as foundation overturning moment. While the use of high towers is ideal for generating electricity, they become a major problem during storms, especially for a shrouded turbine.

Ideally, a wind turbine, or at least the rotors, shroud, and nacelle, would be moved closer to the ground during a major storm. The benefits of lowering a turbine or a significant part of the turbine are twofold, i.e. the rotors, shroud, and nacelle are exposed to less wind by being close to the ground, and the foundation is exposed to less overturning moment because the wind force is not being applied at the end of a long lever.

Some smaller wind turbines, especially those in locations with very strong storms and hurricanes, are designed so that they can lower or fold down during a major storm. However, these defensive operations typically require an operator to go to each individual turbine and operate some equipment to lower the turbine. After the storm, the operator must again go to each individual turbine to restore each turbine in a wind farm into an operational configuration. These defensive operations are more difficult or impossible if there is no electricity on the site.

It would be desirable to provide different methods by which a wind turbine can be protected from excessive wind speeds. Specifically, it would be a significant operational advantage and cost savings if a wind turbine, especially a shrouded turbine, could be protected against a storm without any external user intervention or power, and then restore itself to operational status once the storm has passed.

SUMMARY

Embodiments of the invention provide a number of passive defense designs and methods that enable a wind turbine to escape high wind events. The disclosure includes descriptions of multiple designs and methods for lowering the elevated portion of a wind turbine. Other embodiments of the invention concern ways to connect the elevated portion of a wind turbine to the tower. Numerous counterweight systems are also disclosed which enable the lowering of the elevated portion of the wind turbine.

DETAILED DESCRIPTION

Figure 1:
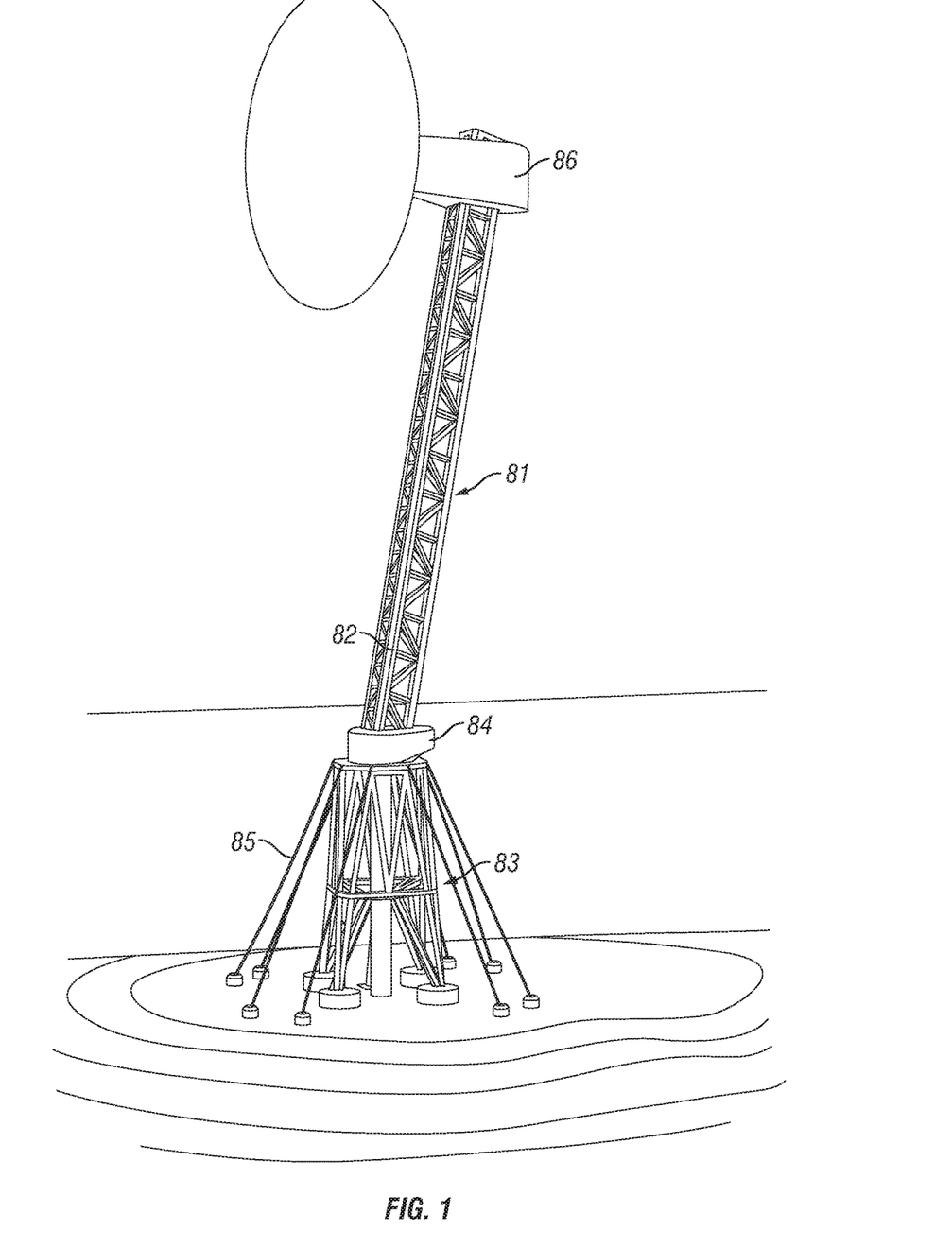
FIG. 1 depicts sliding wind turbine tower.

Embodiments of the invention include a number of passive and active defensive mechanisms that can be incorporated into wind turbines to prevent damage caused by high wind events. FIG. 1 is a diagram of a wind turbine embodying the principals of the invention. The wind turbine comprises a tower 81 which both supports an elevated portion 86 of the wind turbine and allows the elevated portion to slide vertically along the tower. The tower is track-shaped in that one or more rails or tracks 82 are embedded within, constructed as part of, or affixed to the surface of the tower. These tracks extend the full length or nearly the full length of the tower.

The tower may be a truss structure or it may be constructed using any common type of tower, such as a monopole. The tower connects at one end to a primary base 83 at a pivot 84. The primary base is affixed vertically to the ground. Guy wires 85 may optionally be affixed between the ground and the primary base to add additional support. The tower extends upward at an angle less than vertical from the ground plane. A wind turbine providing wind turbine defense during a high wind event may be constructed of a support tower 81 extending upward from a ground plane beneath the support tower and declined away from an axis perpendicular to the ground plane at a declination angle and said support tower configured for receiving an elevated portion via a coupling mechanism in a manner permitting movement of the elevated portion along the support tower length between a working height and a stowed height during the high wind event.

The angle of the tower is selected such that the tower leans into the direction of the wind. In other words, the side of the tower that is closer to the ground faces into the wind. The elevated portion of the wind turbine is mounted to the tower on the downwind side, such that the elevated portion cantilevers outward from the tower over the primary base and foundation in the downwind direction. The elevated portion is capable of moving up and down the tower, between a lower stowed height and an upper working height. The positioning of the elevated portion allows the wind turbine to be self-orienting, that is, passively rotating about the pivot into the direction of the oncoming wind. During a high wind event a support tower 81 extends upward from a ground plane beneath the support tower and declines away from an axis perpendicular to the ground plane at a declination angle and a coupling mechanism couples the elevated portion to the support tower in a manner permitting movement of the elevated portion along the a support tower length, wherein the elevated portion of a wind turbine moves downward along the support tower 81 from a working height to a stowed height during the high wind event. In some embodiments a coupling mechanism couples the elevated portion to the support tower 81 in a manner permitting movement of the elevated portion along the a support tower length, wherein the elevated portion of a wind turbine moves downward along the support tower from a working height to a stowed height during the high wind event. In some embodiments the wind turbine define bears rotationally coupling the support tower to the ground plane with a tower yaw-axis. In some embodiments the a counterweight 1001 mass exceeds the elevated portion mass. In some embodiments the elevated portion mass exceeds the a counterweight 1001 mass.

In one embodiment of the invention, a flag is attached to either the elevated portion of the wind turbine or to the tower. This flag provides sufficient drag to passively rotate the tower about the tower yaw axis, i.e. an axis that is perpendicular to the ground plane. Alternatively, an active system can be used to rotate the tower about the tower yaw axis. The active system can rotate the tower into the wind based on data obtained from wind sensors or based on historical wind data.

Figure 3:
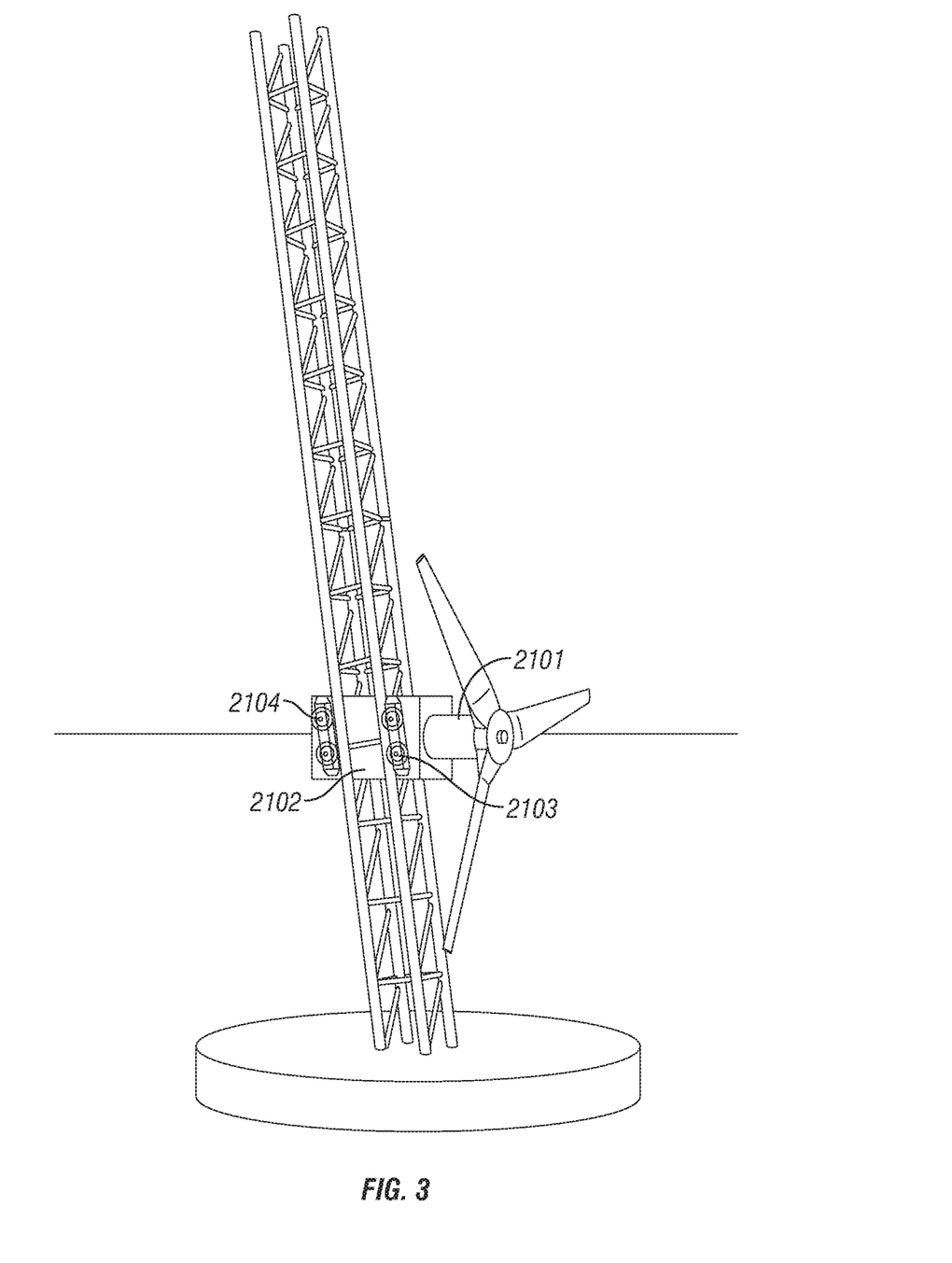
FIG. 3 depicts a trolley supporting the elevated portion of a wind turbine.

As depicted in FIG. 3, in one embodiment of the invention, the elevated portion of the wind turbine 2101 is attached to a trolley 2102. The trolley includes upper 2103 and lower 2104 wheels similar to those of a roller coaster. The upper and lower wheels affix to either side of the slanted track, and secure the elevated portion to the tower.

Figure 4:
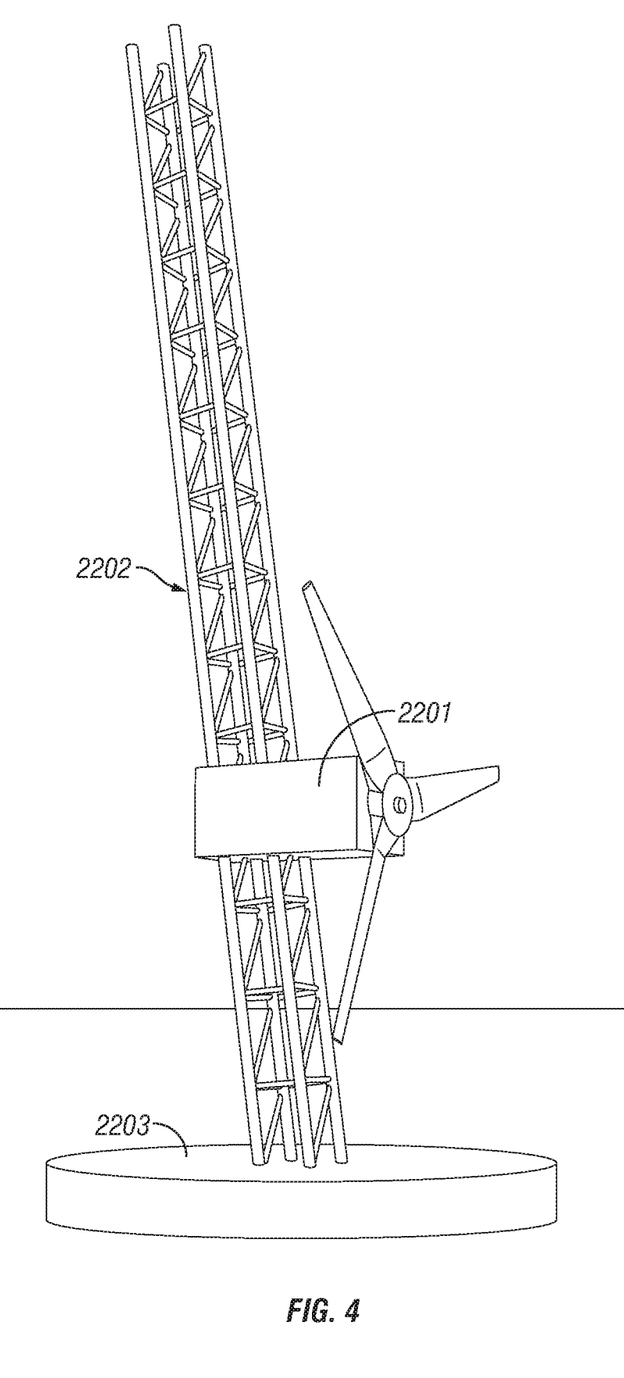
FIG. 4 depicts a lowered wind turbine.

As depicted in FIG. 4, as wind speed increases, the downwind drag forces present on the elevated portion of the wind turbine 2201 increase and, due to the slanted nature of the tower 2202, such downwind forces push the elevated portion down the length of the slanted track towards the primary base 2203. This decrease in height reduces the wind load on the turbine and reduces the lateral forces applied to the primary base by the wind. Rather than rely on the force of the wind, in certain embodiments of the invention the elevated portion of the wind turbine may be raised and lowered on the tower by means of a winch, possibly in combination with a counterweight.

Control signals and power can be conveyed between the elevated portion and the ground through a number of different mechanisms. In one embodiment of the invention, control signals and power are transmitted through the track rails. In one approach, the support tower is triangular in cross-section, with a rail at each corner, each of the rails carrying one of three phases of electricity. The elevated portion, either through a trolley or directly, contacts the rails via brushes or metal wheels.

Figure 5:
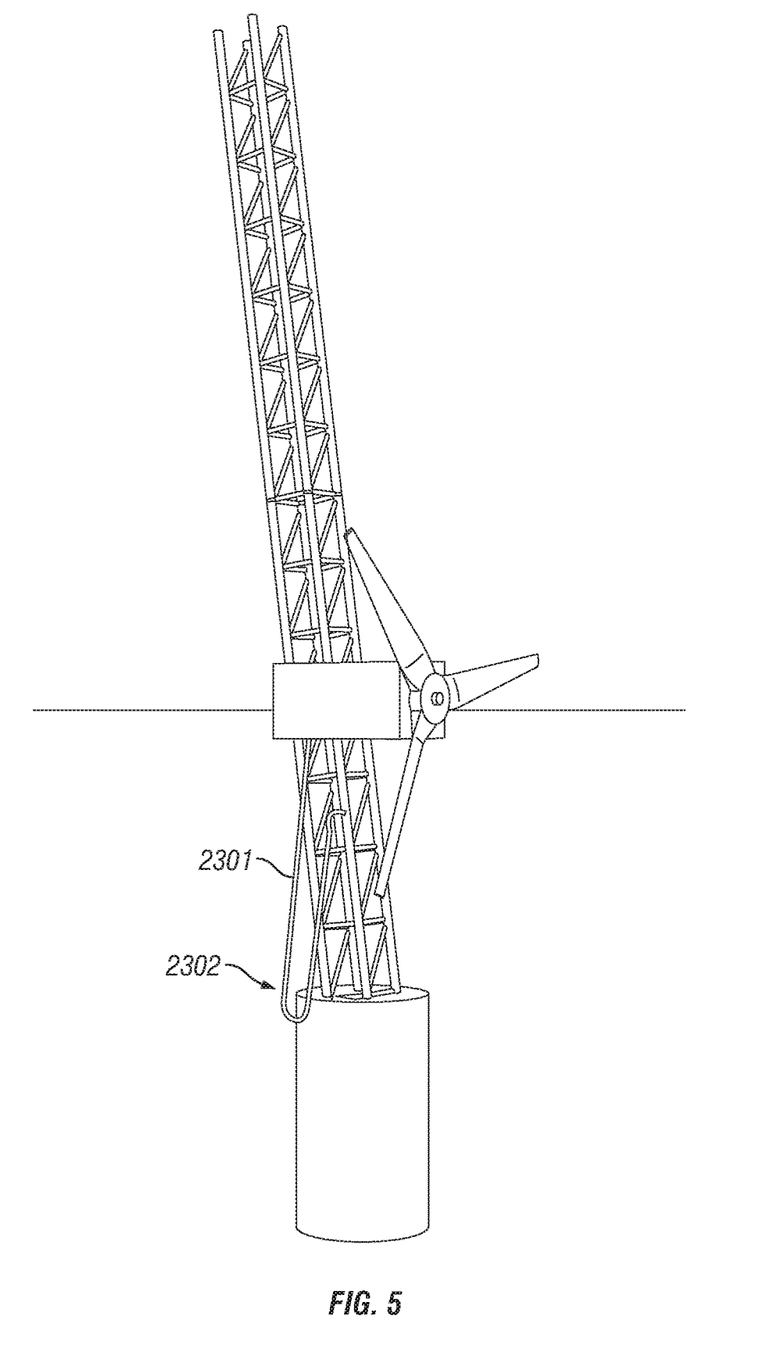
FIG. 5 depicts a flexible cable for transmitting control signals and power.

In another embodiment of the invention, depicted in FIG. 5, control signals and power are transmitted through a flexible cable 2301 that coils into a service loop 2302 upon lowering. Optionally, the flexible cable can be encased in flexible conduit.

Figure 6:
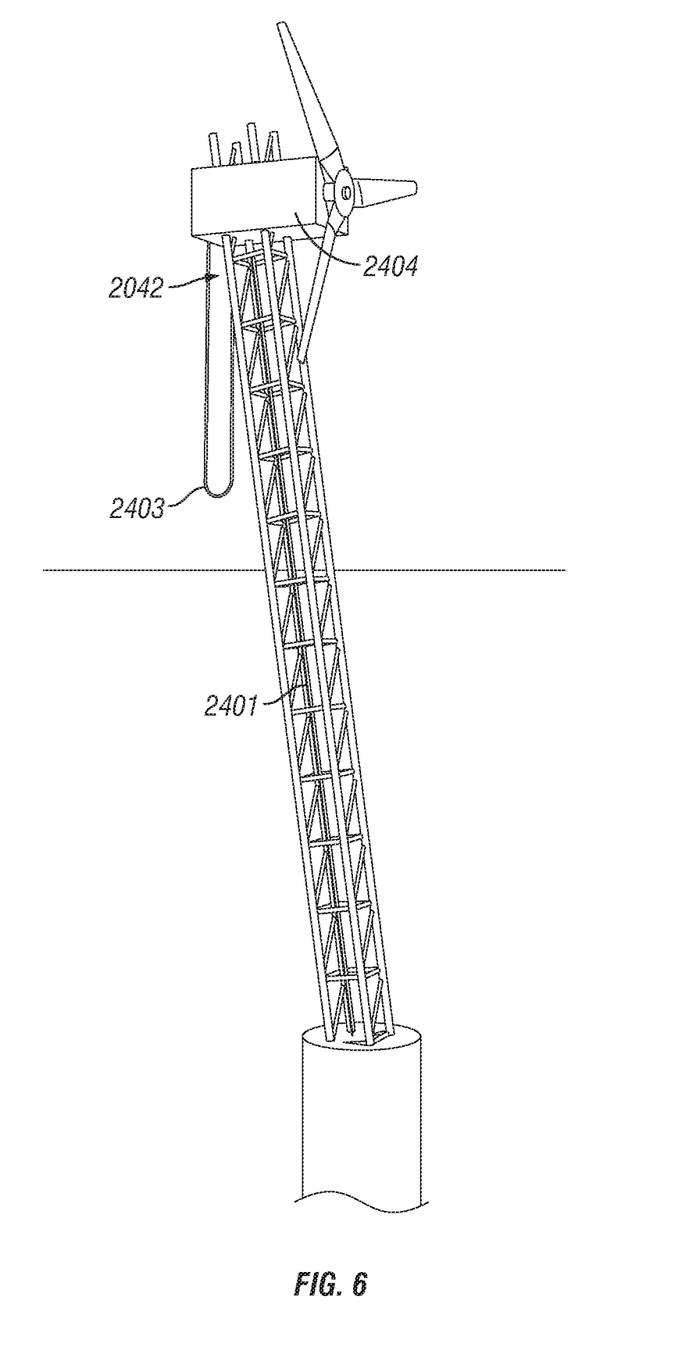
FIG. 6 depicts a rigid conduit for transmitting control signals and power.

In another embodiment of the invention, depicted in FIG. 6, control signals and power are transmitted through a rigid conduit 2401 to the top of the tower 2402. A flexible conduit 2403 extends from the top of the rigid conduit to the elevated portion of the wind turbine 2404. As the turbine is lowered to a stowed height, the flexible conduit fully extends. When the elevated portion of the wind turbine is raised to its normal operating condition, the flexible conduit fully retracts into a stable, downward hanging loop.

Alternatively, the power transmission lines may run through a rigid conduit to a point halfway between the working and stowed heights of the tower. A length of flexible conduit equal to half the distance between the working and stowed heights connects the rigid conduit to the elevated portion of the wind turbine. This allows the turbine to range between the working and stowed heights with a minimal total cable length while still ensuring a stable, downward hanging loop of flexible conduit.

In another embodiment of the invention, control and power are transmitted through a detachable electrical connection, such as a spring loaded contact, which couples the elevated portion to control and power cabling leading to the ground. Detaching the connection enables the elevated portion to lower to the ground without reliance on a service loop in the cabling. The connection is reengaged when the elevated portion is returned to its working height. Optionally, multiple detachable connections spaced along the height of the support tower can allow the elevated portion to operate at multiple discrete heights in response to varying wind speeds.

Figure 2:
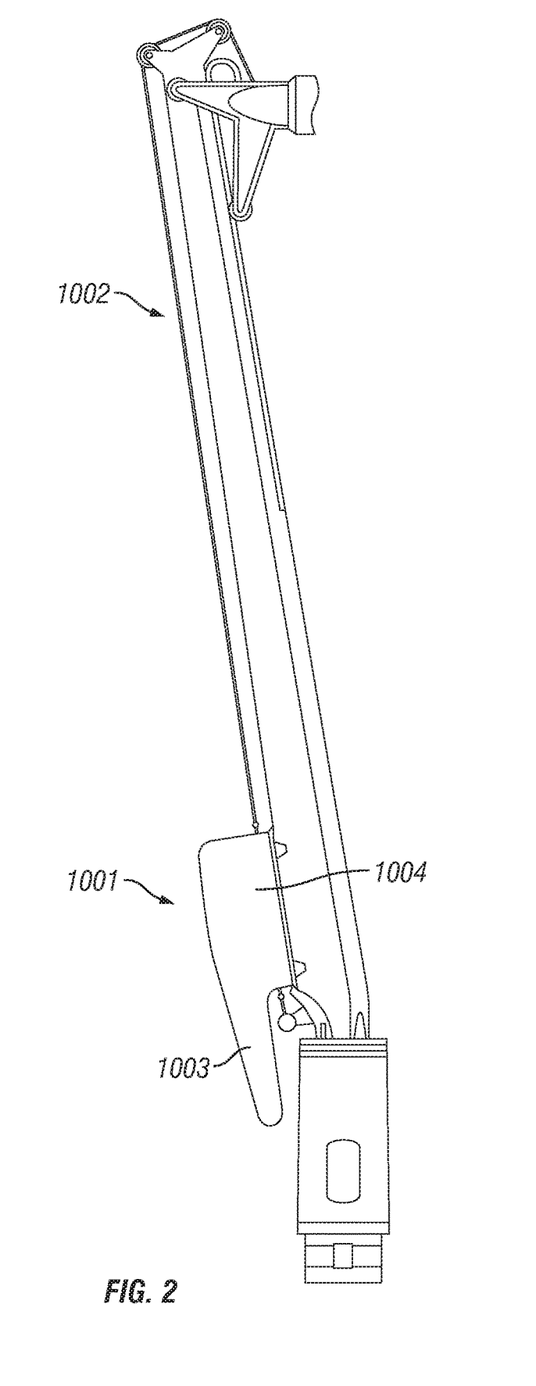
FIG. 2 depicts an aerodynamic counterweight.

To offset the mass of the elevated portion of a wind turbine on a slanted-track tower, a counterweight may be optionally added as depicted in FIG. 2. In this embodiment of the invention, the counterweight 1001 is attached to the elevated portion of the wind turbine by a cable, such that the counterweight reduces the amount of work required to raise the elevated portion to the working height. This reduces the size and cost of an optional winch mechanism that is used to control the position of the elevated portion.

Further, the counterweight may be connected to a trolley conveying the elevated portion of the wind turbine along the track. The counterweight may be connected at an appropriate distance away from the track to balance the force coupled to the upper and lower trolley wheels. In the absence of such a counterbalancing tension from the counterweight, the lower wheels would see a substantial inward load and the upper wheels a substantial outward load associated with the weight of the elevated portion.

In the case of a slanted track wind turbine, as wind speed increases, the downwind drag forces on the elevated portion of the wind turbine push the elevated portion down along the length of the slanted track towards the primary base. The weight of the counterweight relative to the elevated portion of the wind turbine weight can be selected based on the particular behavior desired. An over-weighted counterweight ensures that, in low-wind conditions, the elevated portion can be raised and maintained at the working height with no applied force. At sufficiently high wind speeds, the down-track force offsets the excess weight of the counterweight and moves the elevated portion to the stowed height.

A potential danger of this configuration, however, is the absence of hysteresis, i.e. the elevated portion may exhibit oscillatory behavior if winds vary about the critical (lowering) wind speed. To reduce these oscillations, a hydraulic damping system can be used.

An under-weighted counterweight also prevents such oscillations, but does not completely offset the force required to maintain the elevated portion at working height. Consequently, active control of a winch or a friction brake must be employed to keep the elevated portion at the working height. When a high wind event occurs, the active control releases the elevated portion, thus allowing it to descend to the stowed height. To allow for fully passive defense against high winds, active control may automatically release in the event of a power outage, and centrifugal brakes or elevator brakes may be used to ensure a controlled descent of the elevated portion to the stowed height. A wind turbine that uses this under-weighted counterweight configuration need not have a slanted tower to provide passive stowing capability.

The counterweight system described above, generally offsets the gravitational moment of the elevated portion about the tower base. As the elevated portion lowers to the stowed position it attains a greater horizontal moment arm about the base; correspondingly, as the counterweight rises, it attains a greater horizontal moment arm about the base. The direction of these moments is exactly opposite of each other. However, owing to the unchanging moment of the slanted tower itself, it may be possible to balance these moments precisely for only one combination of elevated portion and counterweight heights. In this case, the moments are preferably balanced when the elevated portion is in the stowed (fully lowered) position. This results in an upwind moment when the elevated portion is in the working height, partly offsetting the anticipated wind loading moment.

Optionally, the trajectory of the elevated portion and counterweight during raising and lowering can be modified away from parallel to one another such that the moment arms vary in a manner that keeps the moments balanced at all combinations of elevated portion and counterweight heights.

The counterweight may also be fitted with a block and tackle so that its change in height, and corresponding change in moment arm, need not match that of the turbine, thus providing additional flexibility in balancing the moments.

A counterweight may be aerodynamic in placement and shape as depicted in FIG. 2. In this instance, the counterweight 1001 is placed either directly upstream or downstream of the tower 1002. The thickness of the counterweight at the edge proximal to the tower approximately matches the thickness of the tower. Similarly, the distal edge is tapered to a lesser thickness to reduce the drag on the tower. To reduce the flagging moment, should the counterweight experience a momentary crosswind, the counterweight is relatively tall in vertical length along the tower and narrow in streamwise length away from the tower.

All directional references, e.g. proximal, distal, upper, lower, upward, downward, left, right, lateral, front, back, top, bottom, above, below, vertical, horizontal, clockwise, and counterclockwise, are only used for identification purposes to aid the reader's understanding of the present invention, and do not create limitations, particularly as to the position, orientation, or use of the invention. Connection references, e.g. attached, coupled, connected, and joined, are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for wind turbine defense during a high wind event, comprising:
    a support tower extending upward from a ground plane beneath the support tower and declined away from an axis perpendicular to the ground plane at a declination angle;
    an elevated portion; and
    a coupling mechanism coupling the elevated portion to the support tower in a manner permitting movement of the elevated portion along a support tower length, wherein the elevated portion of a wind turbine moves downward along the support tower from a working height to a stowed height during the high wind event.

2. The apparatus of claim 1, the coupling mechanism further comprising:
    a track secured to the support tower;
    the elevated portion being coupled to the track for movement of elevated portion along the track.

3. The apparatus of claim 1, the coupling mechanism further comprising:
    a track secured to the support tower; and
    a trolley secured to the elevated portion for rolling movement along the track.

4. The apparatus of claim 1, wherein the declination angle is greater than 0° and less than or equal to 45°.

5. The apparatus of claim 1, wherein the declination angle is oriented toward at least one of a historical wind direction and a recent time-averaged wind direction.

6. The apparatus of claim 1, further comprising:
    a bearing rotationally coupling the support tower to the ground plane about a tower yaw axis.

7. The apparatus of claim 6, wherein the elevated portion is cantilevered outward from the support tower in a downwind direction, and wherein aerodynamic forces on the elevated portion passively control an angular orientation of the support tower about the tower yaw axis.

8. The apparatus of claim 6, further comprising:
a flag member coupled to at least one of the elevated portion and the support tower, wherein aerodynamic forces on the flag member passively control the angular orientation of the support tower about the tower yaw axis.

9. The apparatus of claim 6, further comprising:
an actuation mechanism controlling an angular orientation of the support tower about the tower yaw axis.

10. The apparatus of claim 1, wherein the wind turbine comprises a horizontal axis wind turbine.

11. The apparatus of claim 1, the elevated portion comprising any of:
a rotor;
a gear box; and
a shroud.

12. The apparatus of claim 1, further comprising:
a mechanism for transmitting any of power and communication signals to the elevated portion, the mechanism comprising any of:
one or more rails along the support tower;
one or more flexible cables configured in a service loop;
one or more flexible cables within a flexible conduit; and
one or more spring-loaded contacts.

13. The apparatus of claim 1, further comprising:
a counterweight offsetting at least a fraction of an elevated portion mass.

14. The apparatus of claim 13, wherein a counterweight mass exceeds the elevated portion mass.

15. The apparatus of claim 13, further comprising:
a damping system reducing amplitude of oscillating movement of the elevated portion along the support tower length.

16. The apparatus of claim 13, wherein the elevated portion mass exceeds a counterweight mass.

17. The apparatus of claim 13, further comprising:
a braking mechanism maintaining the elevated portion at a working height during operating wind speeds and automatically releasing the elevated portion for movement toward a stowed height during the high wind event.

18. The apparatus of claim 13, wherein the counterweight is aerodynamic in any of placement and shape.

19. A method for constructing a wind turbine tower providing wind turbine defense during a high wind event, comprising:
constructing a support tower extending upward from a ground plane beneath the support tower and declined away from an axis perpendicular to the ground plane at a declination angle; and
said support tower configured for receiving an elevated portion via a coupling mechanism in a manner permitting movement of the elevated portion along a support tower length between a working height and a stowed height during the high wind event.

20. The method of claim 19, further comprising:
providing a mechanism for transmitting any of power and communication signals to the elevated portion, the mechanism comprising any of:
one or more rails along the support tower;
one or more flexible cables configured in a service loop;
one or more flexible cables within a flexible conduit; and
one or more spring-loaded contacts.

21. The method of claim 19, further comprising:
providing a counterweight offsetting at least a fraction of an elevated portion mass.

22. The method of claim 19, further comprising:
providing a bearing rotationally coupling the support tower to the ground plane about a tower yaw axis.

23. The method of claim 22, wherein the elevated portion is cantilevered outward from the support tower in a downwind direction, and wherein aerodynamic forces on the elevated portion passively control an angular orientation of the support tower about the tower yaw axis.

* * * * *